United States Patent
Yraceburu et al.

(10) Patent No.: US 7,753,595 B2
(45) Date of Patent: Jul. 13, 2010

(54) PRINTER DRUM BEARING MOUNT

(75) Inventors: Robert M Yraceburu, Camas, WA (US); Steven P Downing, Camas, WA (US); Stuart D Spencer, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 11/712,757

(22) Filed: Mar. 1, 2007

(65) Prior Publication Data
US 2008/0212909 A1    Sep. 4, 2008

(51) Int. Cl.
*F16C 13/00* (2006.01)
*B41F 7/00* (2006.01)

(52) U.S. Cl. .......... 384/546; 384/256; 384/549; 101/216

(58) Field of Classification Search .......... 384/50, 384/58, 247, 252, 256, 416–419, 428, 444, 384/493, 546, 548, 549, 557, 587, 905; 101/216, 101/218, 409, 232, 352.03, 477
See application file for complete search history.

(56) References Cited

U.S. PATENT DOCUMENTS

| | | | | |
|---|---|---|---|---|
| 282,796 | A * | 8/1883 | Stearns | 384/495 |
| 1,550,265 | A * | 8/1925 | Knippel | 384/192 |
| 3,955,861 | A * | 5/1976 | Orain | 384/495 |
| 4,433,878 | A * | 2/1984 | Rosenthal | 384/549 |
| 4,555,189 | A * | 11/1985 | Donkin | 384/493 |
| 4,895,461 | A | 1/1990 | Stella | |
| 4,934,838 | A * | 6/1990 | Morner | 384/476 |
| 5,028,149 | A * | 7/1991 | Hardtke | 384/46 |
| 5,234,270 | A | 8/1993 | Mathes | |
| 5,601,021 | A * | 2/1997 | Katabira et al. | 101/218 |
| 5,638,754 | A | 6/1997 | Steinmeier et al. | |
| 5,639,166 | A | 6/1997 | Dittenhofer | |
| 6,132,098 | A | 10/2000 | Zylla | |
| 6,343,551 | B2 | 2/2002 | Kamiyama et al. | |
| 6,817,291 | B2 | 11/2004 | Kobayashi et al. | |
| 7,011,023 | B2 * | 3/2006 | Dittenhofer et al. | 101/218 |

FOREIGN PATENT DOCUMENTS

| JP | 2003170222 | 2/2004 |
|---|---|---|
| WO | WO 02/22361 | 3/2002 |

* cited by examiner

*Primary Examiner*—Thomas R Hannon

(57) ABSTRACT

A bearing mount of a rotatable printer drum having a rotational axis includes a main drum bearing, rotationally supporting the drum and having an outer bearing race, and at least two secondary roller bearings, angularly spaced from each other. The secondary roller bearings are positioned to rollably support the outer bearing race and allow lateral translation of the main bearing.

20 Claims, 6 Drawing Sheets

PRINTER DRUM BEARING MOUNT

BACKGROUND

Drum-type inkjet printing systems generally include one or more fixed inkjet print heads (also called pens) positioned circumferentially around a rotating cylindrical drum. The print media (e.g. paper) is carried by the rotating drum past the print heads, which eject drops of ink in a desired pattern upon the print media.

In order to maintain good image quality, proper maintenance of the pen-to-pen alignment and pen-to-paper spacing is desirable. However, if the print drum translates or wobbles on its bearings as it rotates, the accuracy of inkjet drop placement on the print media can be adversely affected. Wobbling or runout of a rotating print drum can occur in several ways, and the various types of drum wobbling can affect both pen-to-pen alignment and pen-to-paper spacing in the printer, and thereby adversely affect print quality, such as by producing banding and/or grain in the printed image.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
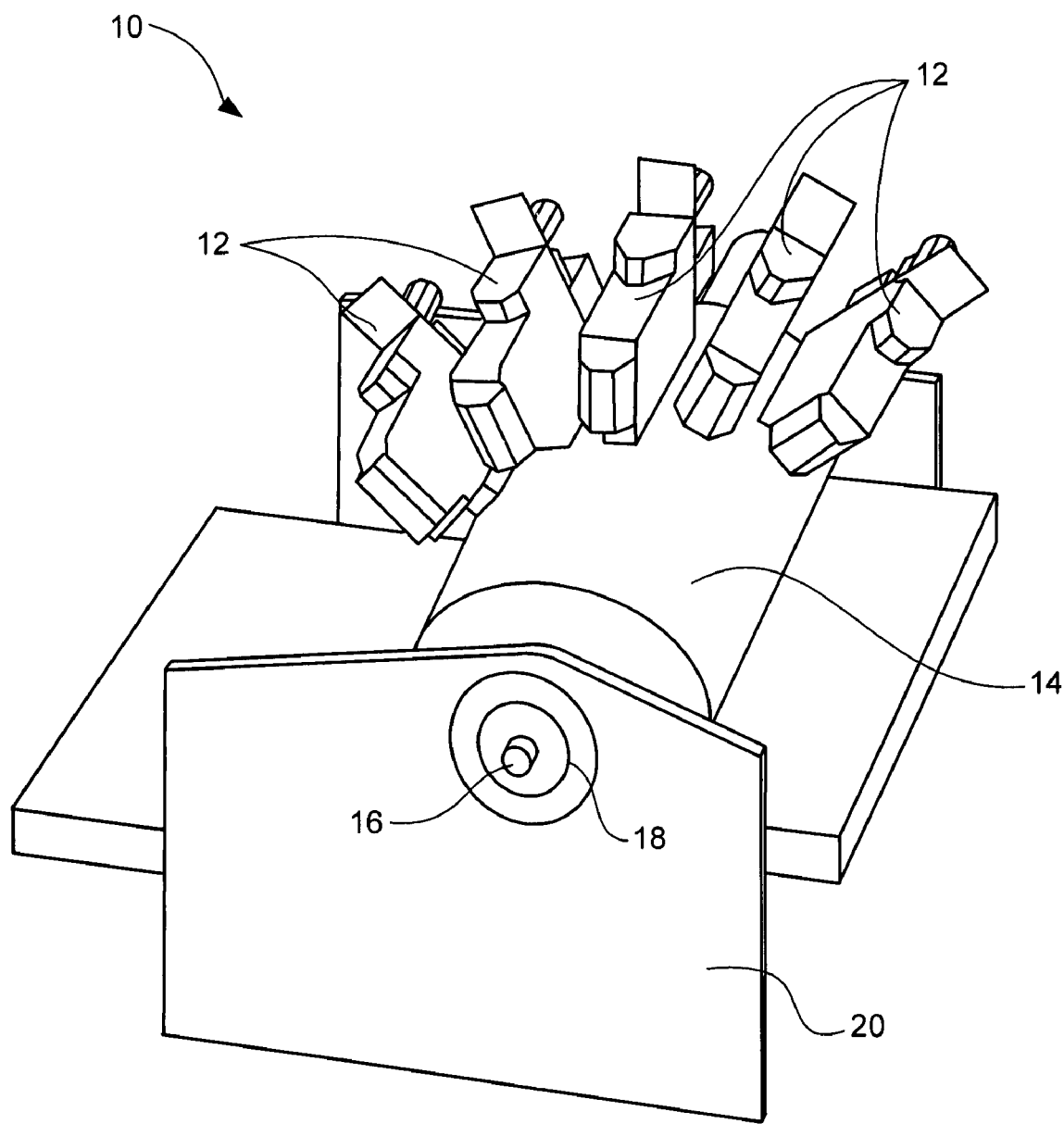
FIG. 1 is a perspective view of a portion of a drum-type inkjet printer having multiple fixed print heads positioned adjacent to the drum.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Fast inkjet printing on a drum surface requires the inkjet pens to be wrapped circumferentially around part of the drum surface. Provided in FIG. 1 is a perspective view of a portion of a drum-type inkjet printer 10 having multiple fixed print heads or pens 12 positioned adjacent to a drum 14. The drum has a transverse axle 16 that is supported by a bearing 18 that is mounted in a fixed printer drum support structure 20. While only one end of the drum is shown in FIG. 1, it will be appreciated that the drum axle extends to the opposite end of the drum and is there supported by a similar bearing that is not visible in the figure.

Figure 2:
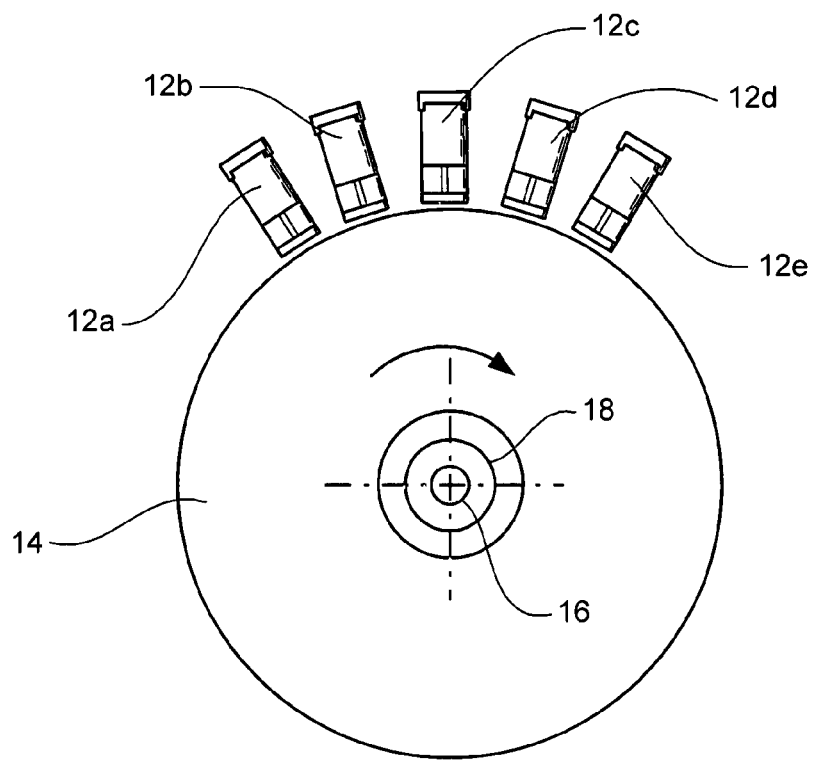
FIG. 2 is an end view of the printer drum of FIG. 1, showing the radial relationship of the print heads to the drum.

An end view of the printer drum 14 and print heads 12 is provided in FIG. 2. The number of print heads can vary. For example, in the printing system shown in FIGS. 1 and 2 there are five print heads, but it will be appreciated that other numbers can be used. Print media such as paper (not shown in FIGS. 1 and 2) is held upon the outer cylindrical surface of the drum (e.g. via vacuum pressure, electrostatic, or clamping mechanisms) as the drum rotates past the fixed inkjet print heads. These types of printers can be configured to print onto the print media in one or more passes, and in one direction or bidirectionally (i.e. printing can occur with the drum rotating first clockwise and then counterclockwise in one or more sequences).

Figure 3:
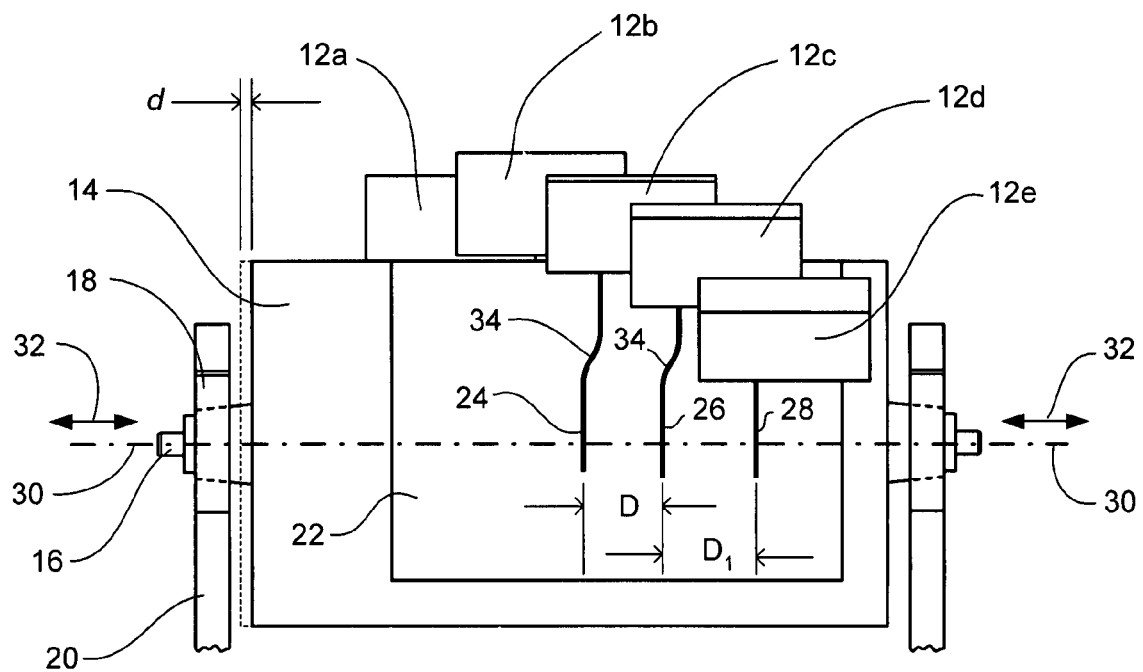
FIG. 3 is a side view of the printer drum of FIG. 1, and illustrates the type of drum movement that occurs when the drum bearings translate laterally.

Wobbling or runout of a rotating print drum can occur in several ways. One is axial translation of the drum, or in other words, side-to-side translation of the drum along its rotational axis. This can adversely affect the apparent pen-to-pen spacing (i.e. pen alignment) and the accuracy of inkjet drop placement on the print media. This type of unwanted drum movement and its effects are illustrated in FIG. 3 (though exaggerated for clarity). In this figure the print heads are labeled 12a-12e. Each print head is positioned to print upon a different longitudinal portion of the print media 22 as the printer drum 14 rotates. This figure illustrates the effect of axial translation of the printer drum upon ink placement. In this illustration, the printer system is printing a group of three evenly spaced longitudinal lines 24, 26, 28 upon the print media, the lines intended to be spaced apart by a distance D.

However, as the drum 14 rotates, it can laterally translate a distance d along its rotational axis 30 upon its bearings 18, as indicated by arrows 32. This can result in printouts that appear as though the pens are misaligned. The drum axis runout is primarily caused by the drum axis bearing mounting surfaces being machined at angle(s) relative to the drum axis 30, or the bearings being seated at angle(s) relative to their mounting surfaces (not properly seated), or a combination of both of the above. The net result is that the bearings can be mounted at a slight angle relative to the drum axis (i.e. the bearings are not coaxial relative to each other) and therefore wobble as the drum rotates. This ends up driving the drum back and forth along its axis.

Since each pen 12 is located at a different position with respect to the drum 14, the pens will print images at a given lateral position upon the media at a different time relative to adjacent pens. For example, viewing FIG. 2, where one pen is at a 10:00 o'clock position and another pen is at a 2:00 o'clock position, and the drum translates back 30 microns as the drum rotates from the 10:00 o'clock to the 2:00 o'clock position, the pens will appear to be misaligned by 30 microns. As a result of the drum translating back by 30 microns during this part of its rotation, it will have to translate forward by 30 microns during another portion of its rotation. This will appear as though the pens are misaligned in the opposite orientation as when the drum translated back by 30 microns. Viewing FIG. 3, the result is that some of the lines (e.g. lines 24, 26) have the desired spacing D, but show a shift in position (designated at 34). Other lines may be spaced a different distance $D_1$ (e.g. lines 26, 28) because the respective print head printed that line at a different point in the rotation of the drum (i.e. after the shift had taken place).

With axial translation of the drum, the apparent misalignment of the pens reverses orientation as the drum rotates. Consequently, there is no single pen alignment setting that can satisfy print quality requirements if there is excessive drum axis runout. For some printing systems, excessive drum axis runout can be anything over about 20 microns. Misalignments of approximately 20 microns or more are detectable by the human eye on plain paper. On special media, such as glossy brochure paper, misalignments of more than 10 microns can be detected by the human eye. How much misalignment is tolerable can vary with print mode or media type, and may be noticeable below 10 microns. It can be desirable to reduce misalignment to a level not detectable by the human eye and varies by media type and print mode")

Figure 4:
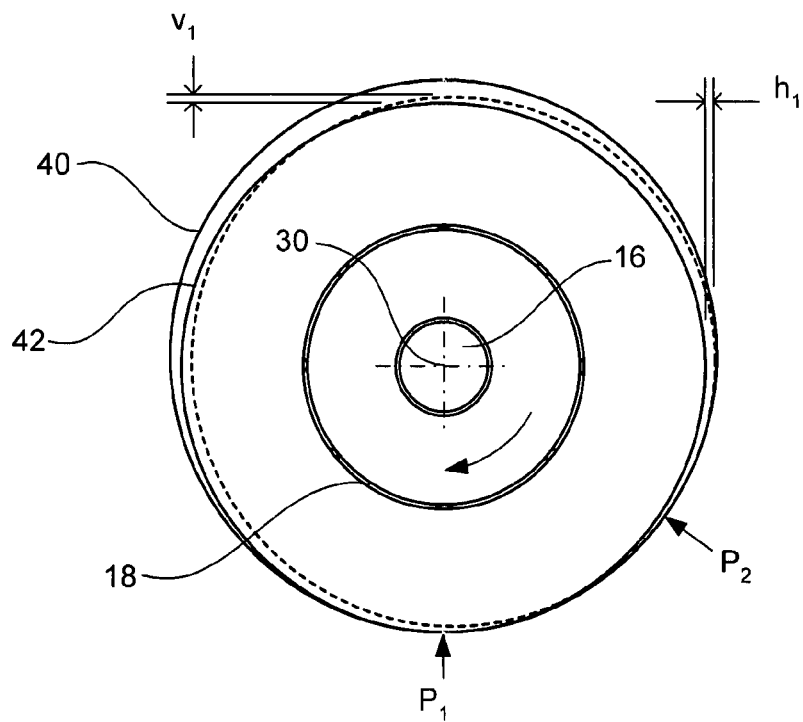
FIG. 4 is a close-up end view of the bearing and bearing support of FIG. 1, showing the bearing mounted in its bore, and illustrating the type of drum movement that occurs when the drum bearing rolls within the bore.

Another type of unwanted drum movement or wobbling can be caused by radial rolling of the drum bearings within their mounts. This type of wobbling is illustrated in FIG. 4. In some drum type printer systems the bearings 18 sit in slightly oversized machined bores 40 in a supporting structure (20 in FIG. 1), where they are free to move within the machined bores. The outer bearing races 42 are smaller than the bores and therefore are free to roll back and forth in response to a variety of forces, such as imbalances in the drum mass, variations in the drive force applied to the drum, media loading or unloading forces, or any non-constant frictional loads. The bottom of the outer bearing race supports the weight of the drum, and is in contact with the bottom of the machined bore at $P_1$. The bottom of the bearing race thus acts as a pivot point as the bearing wobbles back and forth relative to the drum axis. When the bearing does rotate in this way, the effective pivot point can rotate in the bore to point $P_2$. In such a case the drum 14 will move the distance that the center of the bearing moves back and forth, since the theoretical axis of the drum passes through the center 30 of the bearing. This can result in a horizontal translation $h_1$ and a slight vertical translation $v_1$.

Figure 5:
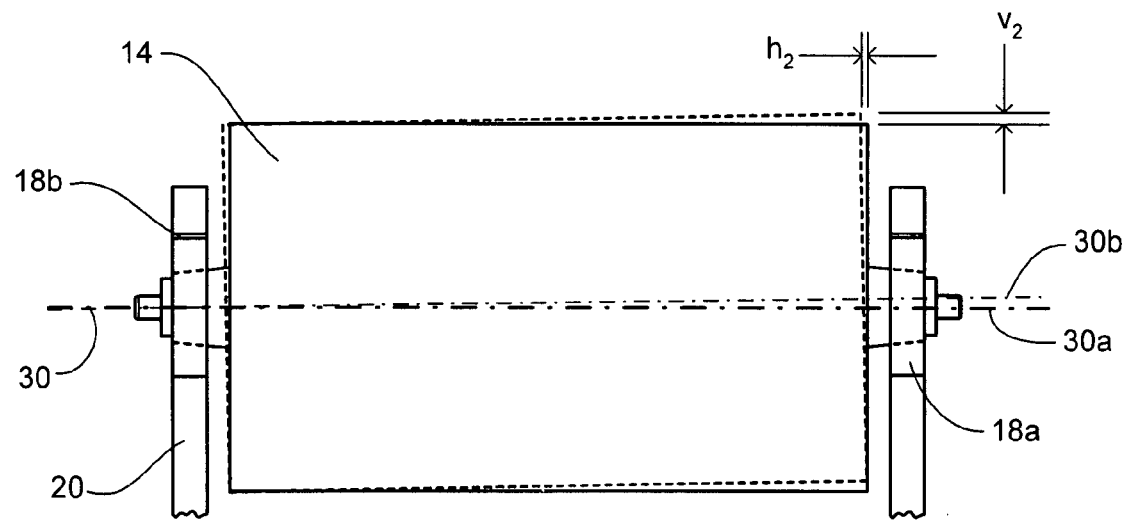
FIG. 5 is a partial side view of the drum of FIG. 1, and illustrates the type of drum movement that occurs when one drum bearing changes position due to rocking in its mounting bore or bearing wobble, and the opposite bearing does not.

A third form of unwanted drum motion is that the drum can rise and fall as the drum bearings wobble. This type of unwanted drum movement is illustrated in FIG. 5. This type of motion occurs where one drum bearing 18a wobbles in its bore and the opposing end of the drum axle does not. This causes the drum surface to rise and fall at a tilt, as indicated by the tilted axes 30a and 30b. This type of unwanted motion primarily affects pen-to-paper spacing as indicated by vertical translation $v_2$, but potentially also affects pen-to-pen alignment as indicated by horizontal shift $h_2$. This tilt is due to the geometry of the bearings, and can be understood with reference to FIG. 8. Viewing FIG. 8, there is a longer distance from the geometric center 150 of the main bearing to the edge 152 of the outer race, than there is from the geometric center of the bearing to the center 154 of the outer race. Consequently, where the main bearing is mounted in an oversized machined bore as in FIG. 4, as the bearing wobbles up on the edge of an outer race, the geometric center of the bearing rises along with the drum axis. If the drum rises on one end only, it will essentially be pivoting about the other end of its axis. Because the drum is pivoting about an end of its axis, there will be a horizontal component to the motion at the surface of the drum that will cause pen-to-pen misalignment and associated print quality defects. This horizontal motion component increases as the drum radius increases.

While the sources of unwanted drum motion mentioned above differ in type, they are affected by the configuration of the drum bearings and the way in which the bearings are attached to the drum support structure. Advantageously, the inventors have devised a printer drum bearing mount that helps prevent or mitigate the types of drum wobbling described above.

Figure 6:
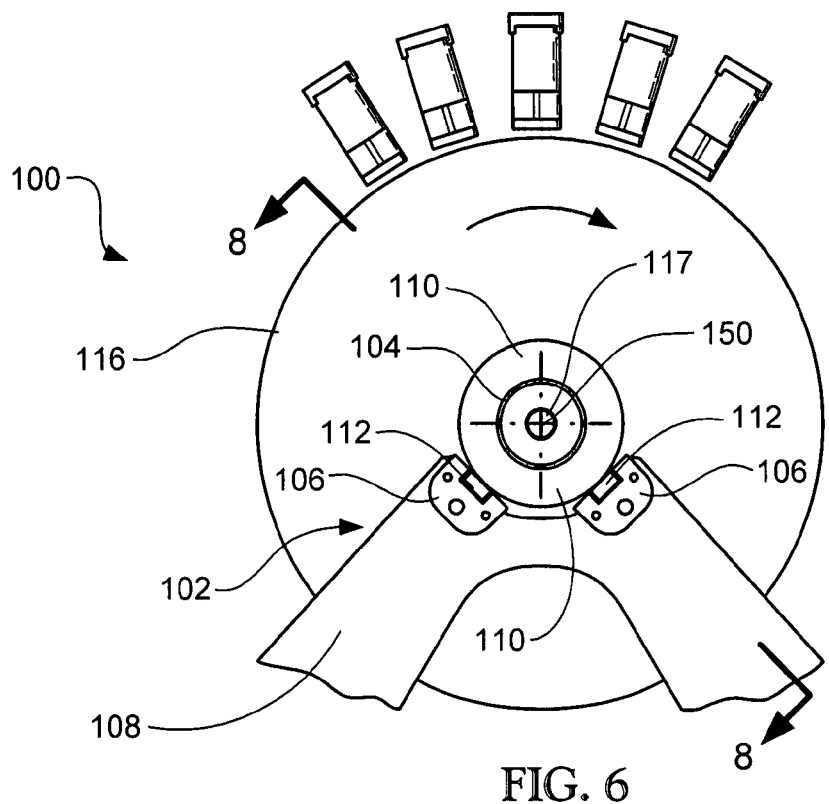
FIG. 6 is a partial end view of a printer drum provided with one embodiment of a printer drum bearing mount having cylindrical roller bearings in accordance with the present disclosure.

One embodiment of a printer drum bearing mount 100 configured in accordance with the present disclosure is shown in FIG. 6. This bearing mount includes a secondary bearing assembly 102 that supports the main drum bearing 104. In the embodiment of FIG. 6, the secondary bearing assembly includes a pair of bearing elements 106 that are attached to a support structure 108 and support the outer race 110 of the main drum bearing. The bearing elements can include cylindrical rollers 112 that are mounted with their rotational axes (represented by lines 114) perpendicular to the rotational axis 150 of the main drum bearing. The relative orientations of the rotational axes of the main and secondary bearings are apparent from viewing FIG. 6 and FIG. 8 together.

If the main drum bearings 104 are not co-axial relative to each other, the drum bearing mounting configuration 100 shown in FIG. 6 allows the main drum bearings to freely wobble about their center, without driving the drum 116 forward and back along its axle 117. As the main drum bearings wobble, the rollers 112 will easily rotate, thus minimizing any axial load on the drum bearings that would move the drum along its axis. That is, the main drum bearing is allowed to axially or laterally translate upon the secondary bearing, so that axial translation is not transmitted to the printer drum.

Figure 8:
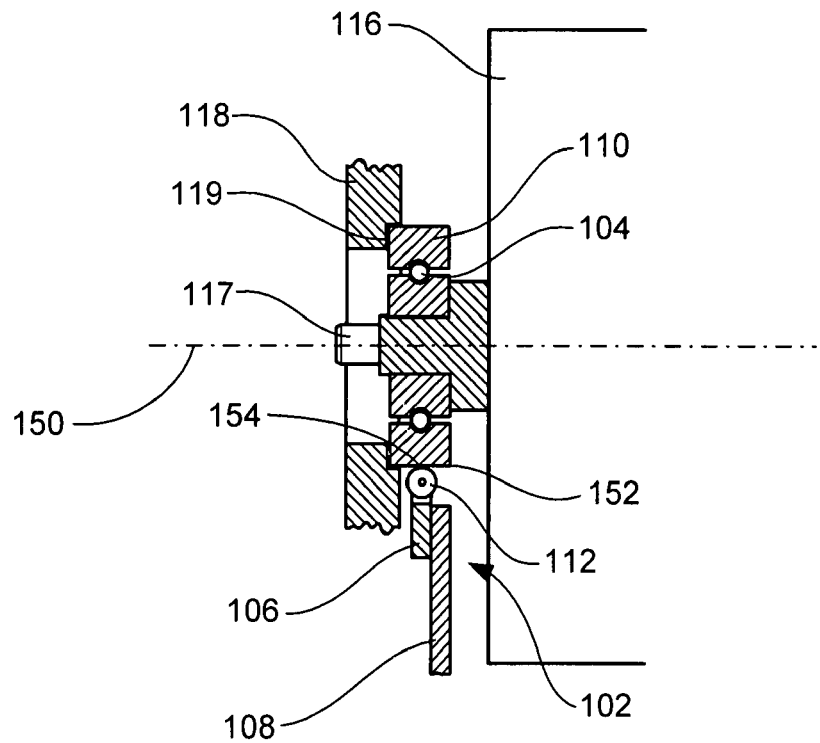
FIG. 8 is a close-up cross-sectional view of a drum and bearing like that of FIG. 6, the outer race of the main drum bearing being disposed against a thrust plate.

As shown in FIG. 8, the bearing support structure can also include a thrust plate 118 that is fixed within the printer system and bears against the outer race 110 of the main bearing 104. This thrust plate includes a shoulder 119 that bears against the outer bearing race to fix the lateral position of the main bearing, while the secondary bearing assembly 102 supports the main bearing in the vertical dimension. The opposite end of the drum (not shown) can have a spring load on the outer race of the rear bearing. This creates a reaction force against the shoulder of the thrust plate 118. In this embodiment it is desirable that the thrust plate be oriented perpendicular to the drum axis 150.

Figure 9:
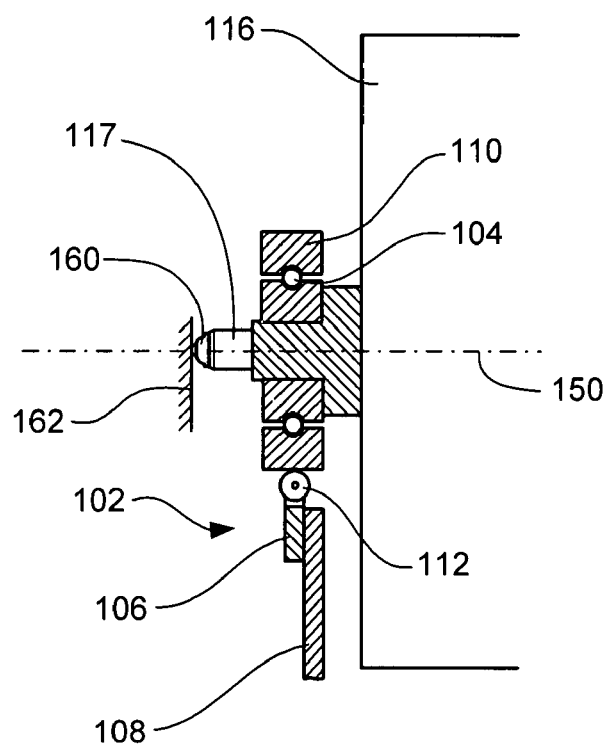
FIG. 9 is a close-up cross-sectional view of an alternative printer drum bearing mount having an axial thrust bearing on the drum axle.

In an alternative embodiment, shown in FIG. 9, the printer drum 116 can include a thrust bearing 160 disposed on the end of the drum axle 117, instead of the thrust plate (118 in FIG. 8). The thrust bearing is positioned to contact a point bearing plate 162 that can be of metal (e.g. oil-impregnated bronze) or other suitable material. The thrust bearing can be a roller bearing that is attached to the end of the drum axle, or it can be a solid bearing pin (e.g. of hardened steel) that has a rounded (e.g. hemispherical) bearing surface and is affixed to or formed upon the end of the drum axle.

Figure 7:
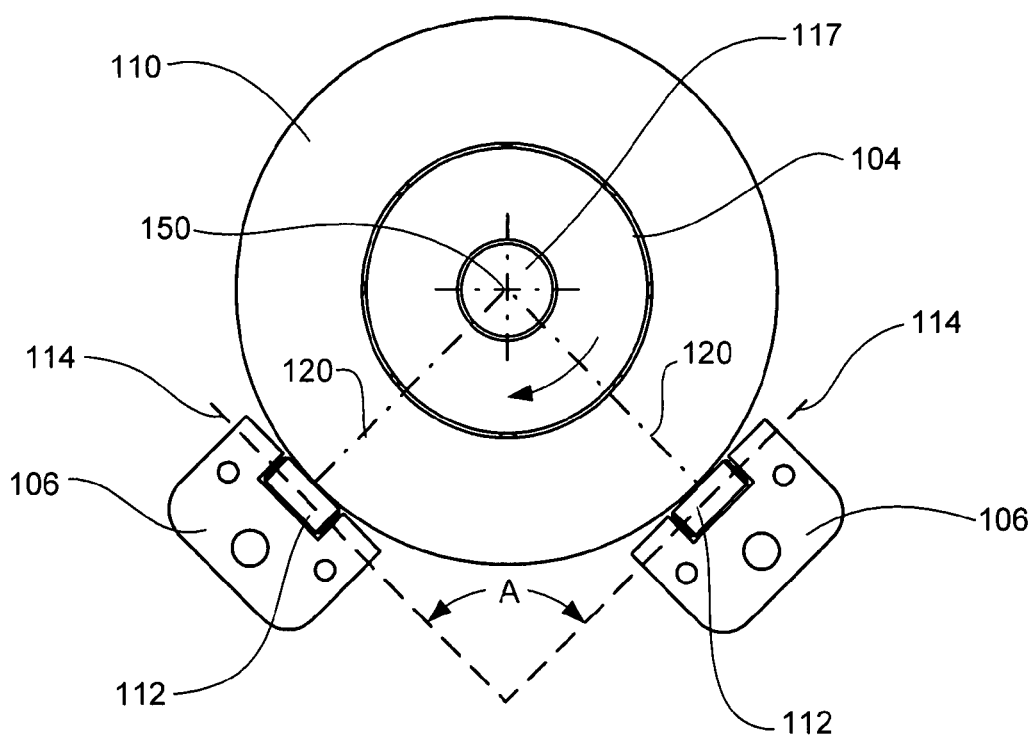
FIG. 7 is a close-up end view of the bearing mount of FIG. 6.

This secondary bearing assembly 102 is configured to prevent rocking of the main drum bearing 104. As shown in FIG. 7, the bearing elements 106 of the secondary bearing assembly 102 are angularly spaced at an angle A so that the points of contact on the outer race 110 of the main bearing 104 form a "V" shaped slot into which the main bearing rests. The line of action 120 of the two roller bearings 112 passes through the center of the drum axis 150. This orientation helps prevent the main drum bearings from rocking by providing two widely spaced points of contact around the circumference of the main bearing. The stationary point for the secondary bearing is at the theoretical center of the main bearing, rather than at the bottom of the main bearing outer race (as at $P_1$ in FIG. 4).

With two points of contact around the circumference of the bearing, the drum bearings cannot rock unless a very large force acts upon the drum to lift the drum out of the "V" shaped slot. Given the weight of the printer drum and its generally low rotational speeds and acceleration, the force required to rock the bearing out of the "V" shaped slot can be far outside the operating range of the printer system.

The angular spacing A of the secondary bearing elements can vary. The secondary bearing elements shown in FIG. 7 are separated by an angle of about 90°, but other angular values, both larger and smaller, can be used. An appropriate angular spacing for a given printer system can depend upon the diameter of the main bearing, the weight of the printer drum, and the driving forces that are expected to be imposed upon the drum. Additionally, while two secondary bearing elements 106 are shown, more that two secondary bearing elements can be used to provide multiple points of contact between the secondary bearing and the main bearing.

Another aspect of the secondary bearing elements 106 is shown in the cross-sectional view of FIG. 8. The pair of secondary bearing rollers 112 are positioned so that their point of contact with the outer race 110 of the main bearing 104 is approximately in the center 154 of the outer race surface (measured relative to the thickness of the outer race), rather than toward one edge or the other (e.g. edge 152). With this configuration any rise and fall of the main drum bearings as they wobble will be minimized. This prevents the drum from tilting by pivoting about one end of its axis, as shown and described above with respect to FIG. 5.

Figure 10:
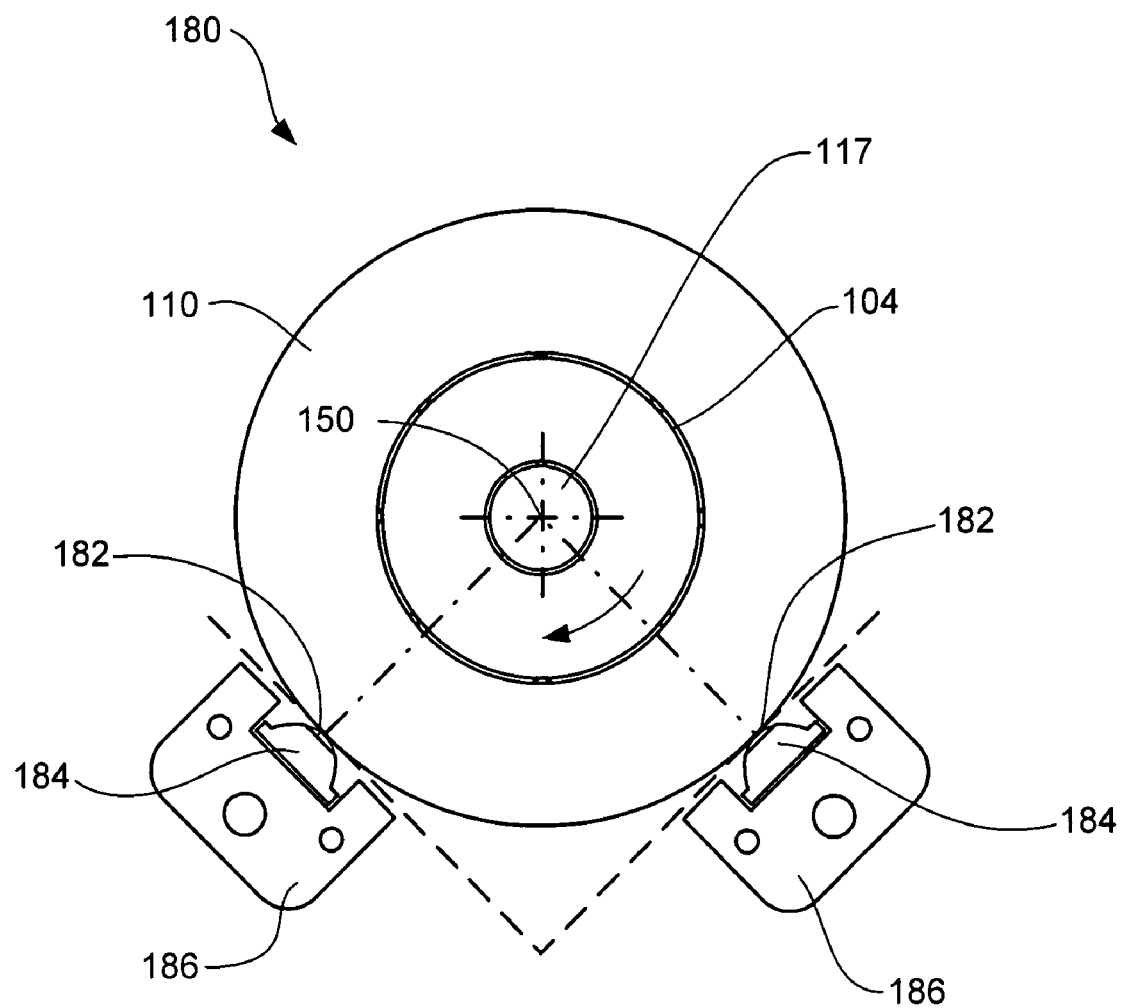
FIG. 10 is a close-up end view of a printer drum provided with a printer drum bearing mount having a secondary bearing including a pair of spherical rolling elements.

As an alternative to cylindrical rollers 112 for the secondary bearing elements 106, spherical rolling elements can also be used. A secondary bearing 180 having a pair of spherical rolling elements 182 is shown in FIG. 10. In this configuration, each spherical rolling element is encased in and rotates within a socket 184 that is mounted to a support plate 186. Only a small portion of the spherical rolling element is exposed, and this exposed portion contacts the outer race 110 of the main bearing 104. The spherical rolling element support plates are attached to the support structure (108 in FIG. 6), and support the main bearing at angularly spaced locations in the manner described above. Since the spherical rolling elements can rotate in any direction, and are not limited to rotation about a linear axis, the spherical rolling element configuration allows the secondary bearings to accommodate a variety of types of motion or wobbling of the main bearing, or other irregularities in the shape or motion of the main bearing.

There are multiple types of rollers or bearings that can be used to support the drum bearings. The inventors have used cylindrical bearings comprising dowel pins in pockets. Larger diameter rollers with smaller axles and bearings mounted on axles have also been tested. Both had acceptable performance.

The printer drum bearing mount disclosed herein helps to reduce at least three types of drum runout that all have a detrimental effect on print quality. It helps reduce axial drum runout by allowing the main bearings to wobble freely on the drum axis. It also helps reduce radial runout caused by the drum bearings rocking. This is accomplished by providing at least two points of contact (two rollers or ball bearings) around the circumference of the drum bearings. Finally, this drum bearing configuration helps prevent pivoting of the drum about one end of the drum axis caused by the drum bearing wobbling from edge to edge. This is accomplished by locating the secondary bearing rollers in the middle of the drum bearing.

This design also does not require a new more costly drum axle design, more rigid support structure, or more complicated and costly main bearings. A relatively low cost axle and main drum bearing design can be used and still maintain very tight drum runout tolerances. This configuration also allows for a lighter weight and smaller drum and supporting structure, allowing the overall printer to be smaller and lighter. Additionally, this configuration can reduce wear, fretting and permanent drum location changes (which can affect pen to paper spacing).

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A bearing mount of a rotatable printer drum having a rotational axis, comprising:
   a main drum bearing, rotationally supporting the drum, having an outer bearing race; and
   at least two secondary roller bearings, angularly spaced from each other, positioned to rollably support an outer surface of the outer bearing race and allow lateral translation of the main bearing.

2. A bearing mount in accordance with claim 1, wherein the secondary roller bearings are selected from the group consisting of cylindrical rollers and spherical rollers.

3. A bearing mount in accordance with claim 1, wherein the secondary roller bearings comprise cylindrical rollers having an axis of rotation that is substantially perpendicular to the rotational axis of the drum.

4. A bearing mount in accordance with claim 1, wherein the outer bearing race has a curved outer surface against which the secondary roller bearings bear.

5. A bearing mount in accordance with claim 1, wherein the secondary roller bearings are positioned to bear against a central region of a thickness of the outer bearing race.

6. A bearing mount in accordance with claim 1, wherein the secondary roller bearings are spaced apart by an angle of about 90°.

7. A bearing mount in accordance with claim 1, further comprising: a thrust plate, disposed against the outer bearing race on a side of the main bearing opposite the drum, the thrust plate being oriented substantially perpendicular to the rotational axis of the drum and configured to resist lateral translation of the drum.

8. A bearing mount in accordance with claim 1, wherein the angular spacing of the at least two secondary roller bearings defines a "V" shaped slot in which the main bearing rests.

9. A bearing mount in accordance with claim 1, further comprising:
   a drum axle having a distal end, the drum being attached to the drum axle;
   a thrust bearing, disposed upon the distal end of the drum axle; and
   a point bearing plate, positioned to bear against the thrust bearing, configured to resist lateral translation of the axle.

10. A bearing mount in accordance with claim 9, wherein the thrust bearing is selected from the group consisting of a roller bearing and a bearing pin.

11. A drum-type printer, comprising:
    a printer drum, having a rotational axis;
    a main bearing, rotationally supporting the printer drum at opposing ends thereof;

at least two secondary roller bearings, angularly spaced from each other, positioned to rollably support an outer surface of an outer bearing race of the main bearing while allowing axial translation thereof, said at least two secondary roller bearings being configured to resist rotation of the main bearing about the rotational axis; and a support structure, fixedly supporting the at least two secondary roller bearings.

12. A drum-type printer in accordance with claim 11, wherein the secondary roller bearings are selected from the group consisting of cylindrical rollers and spherical rollers.

13. A drum-type printer in accordance with claim 11, wherein the secondary roller bearings comprise cylindrical rollers having an axis of rotation that is substantially perpendicular to the rotational axis of the drum.

14. A drum-type printer in accordance with claim 11, wherein the secondary roller bearings are spaced apart by an angle of about 90°.

15. A drum-type printer in accordance with claim 11, further comprising: a thrust plate, disposed against the outer bearing race of the main bearing, for resisting lateral translation of the drum.

16. A drum-type printer in accordance with claim 11, further comprising: a thrust bearing, disposed upon a distal end of an axle of the drum and positioned to bear against a point bearing plate, for resisting lateral translation of the drum.

17. A printer drum bearing mount of a rotatable printer drum affixed upon an axle with a rotational axis, comprising:

a main drum bearing, rotationally supporting the axle, having an outer bearing race;

a secondary bearing assembly, comprising at least two secondary roller bearings, angularly spaced from each other, positioned to rollably support an outer surface of the outer bearing race and allow lateral translation of the main bearing; and a thrust resistant structure, configured to resist lateral translation of the drum.

18. A printer drum bearing mount in accordance with claim 17, wherein the secondary roller bearings are spaced apart by an angle of about 90°, and are positioned to bear against a substantially central region of a thickness of the outer bearing race.

19. A printer drum bearing mount in accordance with claim 17, wherein the secondary roller bearings are selected from the group consisting of cylindrical rollers and spherical rollers.

20. A printer drum bearing mount in accordance with claim 17, wherein the secondary roller bearings comprise cylindrical rollers having an axis of rotation that is substantially perpendicular to the rotational axis of the drum.

* * * * *